H. GUTZWILLER.
ELECTRIC INTERNAL TUBE HEATER.
APPLICATION FILED AUG. 7, 1918.
1,336,559.
Patented Apr. 13, 1920.
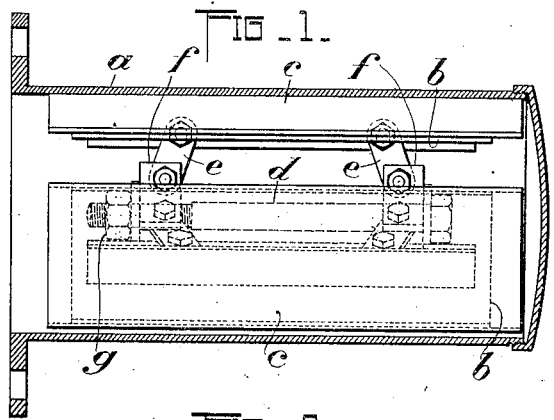
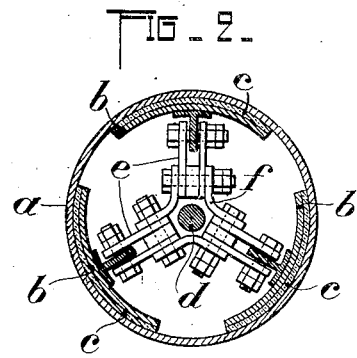
INVENTOR:
HERBERT GUTZWILLER
BY:
ATTORNEY.

UNITED STATES PATENT OFFICE.

HERBERT GUTZWILLER, OF SCHÖNENWERD, SWITZERLAND.

ELECTRIC INTERNAL TUBE-HEATER.

1,336,559.  Specification of Letters Patent.  Patented Apr. 13, 1920.

Application filed August 7, 1918. Serial No. 248,770.

*To all whom it may concern:*

Be it known that I, HERBERT GUTZWILLER, a citizen of the Swiss Republic and resident of Schönenwerd, Canton of Soleure, Switzerland, have invented new and useful Improvements in Electric Internal Tube-Heaters, of which the following is a full, clear, and exact specification.

In constructions for the electric heating, especially in the cases of considerable capacities of current, it is frequently desirable to apply the electric heating on the inside of cylindrical tubes. Such tubes with inner electric heating are employed for example in hot water boilers for domestic purposes.

The hitherto employed inner heating bodies for tubes, when they are arranged so as to be easily removable, have generally an insufficient contact with the tube walls and consequently give a bad heat transmission from the heating resistance to the liquid surrounding the tube. When the said contact is insured by a spreading-out action, as for example in helically wound wire-like heating bodies, the latter are liable to be distended or stretched during the spreading-out.

The subject of the present invention is an electric internal tube heater which in all respects has the required properties, the heater comprising several independent heating elements capable of being moved outward radially by means of a spreading-out device.

Figure 1 of the accompanying drawing is a longitudinal section of an embodiment of such a heater and Fig. 2 is a cross section thereof.

The represented heater is shown as inserted into a heating tube $a$ of an electric boiler. It comprises three curved iron segments $b$, independent from each other, the curvature of which corresponds exactly to the curvature of the inner wall of the tube $a$ and which carry the heating bodies $c$. The segments $b$ with these bodies $c$ constitute each a unit which may be considered as a heating segment. The three heating segments are connected each by means of two links $e$ with two cross heads $f$ mounted upon a screw bolt $d$ common to said heating segments and arranged axially within the tube, the screw bolt $d$ being provided with a nut $g$ in such a manner that by these means the heating segments can be firmly pressed against the inner wall of the tube. Each heating segment, its connecting links $e$ and the bolt $d$ are so arranged that the links $e$ are directed according to the non-parallel sides of a trapezium. The heater can be inserted into the tube $a$ when the heating segments have been brought near together so as to allow their free introduction into the tube. After the heater has thus been inserted, the screw nut is tightened and the heating segments are thereby spread out by the links $e$ and in this way uniformly and tightly applied to the inner wall of the tube so as to insure a very close contact therewith.

The construction just described is very advantageous for boiler tubes of 15 to 30 centimeters in diameter. For greater boiler tubes, the heater is provided for example with six heating segments coupled by pairs and tightened by means of a similar screw or other pressure device. In long tubes the heating segments may be subdivided transversely and their subdivisions conveniently connected together.

The number of heating segments and the construction of their applying device may vary.

What I claim is:

1. An electric internal tube heater, comprising curved segments with heating bodies, independent from each other, thus constituting separate heating segments, the curvature of which corresponds to that of the inner wall of the tube, said segments being movably connected to a screw device centrally arranged within the tube and designed to allow of tightly pressing the segments against the inner wall of the tube.

2. An electric internal tube heater, comprising three curved segments with heating bodies, independent from each other, thus constituting separate segments, the curvature of which corresponds to that of the inner wall of the tube, a common screw bolt axially arranged within the tube, and a plurality of links movably connecting each of the heating segments with said screw bolt, said links being arranged according to the non-parallel sides of a trapezium, to allow of spreading out of said heating segments.

In witness whereof I have hereunto signed my name this 19th day of June 1918, in the presence of two subscribing witnesses.

HERBERT GUTZWILLER.

Witnesses:
 H. H. DICK,
 AMAND RITTER.